United States Patent [19]

Chesworth et al.

[11] Patent Number: 4,698,199

[45] Date of Patent: Oct. 6, 1987

[54] RETRACTABLE DUCT CONNECTORS IN A NUCLEAR REACTOR

[75] Inventors: Graham Chesworth, Warrington; Garth J. Aspden, Bolton, both of England

[73] Assignee: National Nuclear Corporation Limited, London, England

[21] Appl. No.: 713,632

[22] Filed: Mar. 19, 1985

[30] Foreign Application Priority Data

Apr. 6, 1984 [GB] United Kingdom ................. 8408903

[51] Int. Cl.[4] .................. G21C 11/08; G21C 9/00
[52] U.S. Cl. ................................. 376/206; 376/290; 376/298; 376/460; 285/31
[58] Field of Search .............. 376/460, 205, 206, 402, 376/403, 404, 405; 376/290, 298; 285/31, 32, 302, 370, 397

[56] References Cited

U.S. PATENT DOCUMENTS

| 3,381,976 | 5/1968 | Goodson et al. | 285/370 X |
| 3,830,695 | 8/1974 | Sauvage | 376/290 X |
| 3,888,730 | 6/1975 | Jackson | 376/290 |
| 4,168,090 | 9/1979 | Kaufmann, Jr. | 285/302 |

FOREIGN PATENT DOCUMENTS 1303055  1/1973  United Kingdom ................. 376/206

Primary Examiner—John F. Terapane
Assistant Examiner—John S. Maples
Attorney, Agent, or Firm—William R. Hinds

[57] ABSTRACT

In a nuclear reactor of the type in which the vault has a roof in which inner and outer rotatable shields are mounted, coolant is supplied to the roof and shields via duct penetrations which extend in the plane of rotation and can be brought into alignment and connected together by slidable connectors when relative rotation between the shields and roof is not required. When such rotation is to be effected, the connectors can each be retracted into a respective duct so that rotation is not obstructed thereby.

5 Claims, 3 Drawing Figures

RETRACTABLE DUCT CONNECTORS IN A NUCLEAR REACTOR

BACKGROUND OF THE INVENTION

This invention relates to nuclear reactors, and in particular to that kind of nuclear reactor known as a liquid metal cooled fast breeder reactor in which a core composed of fuel elements is disposed within a tank containing liquid metal and heat generated in the core is extracted by liquid metal flowing between the core and one or more heat exchangers, the tank being housed in a vault provided with a roof in which rotatable shields are mounted, allowing fuel elements to be charged into and discharged from the core when necessary.

The vault roof and the rotatable shields therein constitute the main shielding above the reactor core and protect operators and equipment. To fulfill their support and shielding function properly, the roof and shields require to be cooled in a manner such that an acceptable temperature gradient from inside to outside is set up. Hitherto, cooling of the roof and shields has been by flowing coolant therethrough, with the rotating shield coolant inlet and outlet pipe work situated above the roof and shields. This pipework takes up valuable space above the roof and is prone to accidental damage during reactor component removal. Furthermore, when refuelling is necessary, the coolant connections to the shields have to be broken to allow rotation, and temporary cooling of the shields by forced circulation of ambient air has been necessary, which adds further complication to the refuelling operation.

FEATURES AND ASPECTS OF THE INVENTION

It is an object of the present invention to provide cooling of rotating shields in a manner which is simpler and less space-demanding than hitherto, and which allows refuelling operations to be undertaken with considerably less preparation ad restoration effort, so far as cooling is concerned, than hitherto.

According to the invention there is provided a nuclear reactor having a roof in which shields are mounted for rotation and provided with ducting for the supply of coolant to the roof and shields characterised in that said ducting comprises ducts associated respectively with the roof and the shields and arranged to register with each other across the roof/shield and shield/shield gaps when the roof and said shieids are in predetermined angular relation with each other, and further characterised in that the aligned ducts are connected to one another by connectors which bridge said gaps and are capable of being removed into one of the ducts which they interconnect so as to allow the shields to be rotated relative to the roof and to one another.

DESCRIPTION OF THE DRAWINGS

A constructional embodiment of the invention will now be described by way of example, with reference to the accompanying drawings, wherein.

THE PRIOR ART

Figure 1:
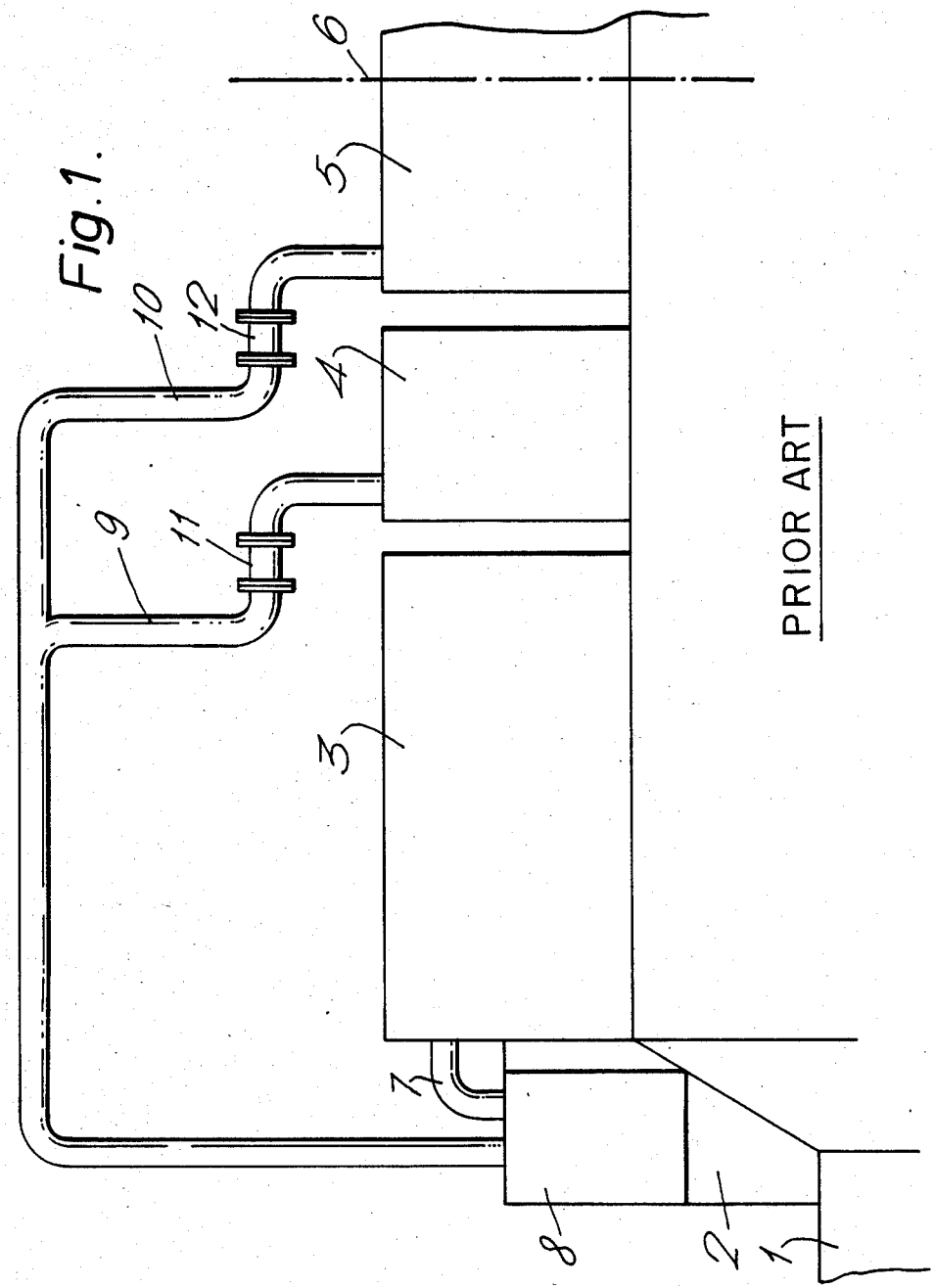
FIG. 1 is a diagrammatic detached side view of an existing design applicable to the roof and shields of a nuclear reactor of the kind hereinbefore specified.

FIG. 1 illustrates a current design of roof and shields cooling and is provided for comparison purposes. It shows the relevant portion only of the reactor vault 1 which carries via cone support 2 the roof 3 whose central portion is made up from an outer rotatable shield 4 and an inner rotatable shield 5, the ability to refuel at various radial positions of the core (whose centre line is illustrated by the dot-and-dash line 6) being provided by the relative rotation of shields 4 and 5 which are eccentrically related and are rotatable about generally vertical axes.

In the current design illustrated in FIG. 1, cooling by nitrogen gas is employed. A typical one of a number of supply pipes designated 7 from a feed header main 8 supplies the roof 3 radially, and typical ones of pipes 9 and 10 supply the shields 4 and 5 respectively from a header thereabove. For the sake of simplicity, corresponding outlet pipes have not been illustrated, but they are similar and extend to a return header main. Each of the many pipes 9 and 10 has a removable section 11, 12 respectively, the sections having to be removed at shutdown for refuelling, and each of the pipes 9 and 10 also having to be blanked off or valved off. The same must be done for the outlet pipes. For cooling of the shields 4, 5 during refuelling, flexible connections to the inlet and outlet pipes have to be established and a forced flow of ambient air via pumping means is set up. The reverse of these procedures takes place at the end of refuelling in preparation for start-up.

DESCRIPTION OF A PREFERRED EMBODIMENT

Figure 2:
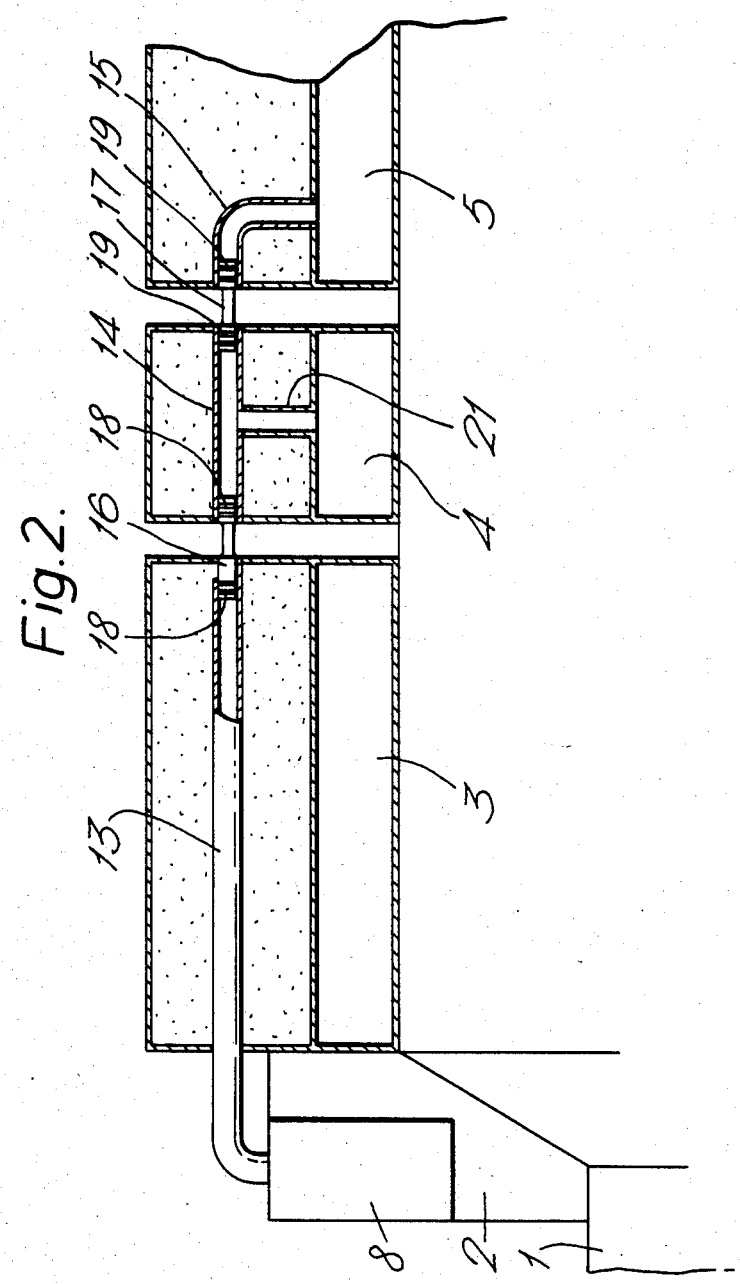
FIG. 2 is a similar view but illustrating a construction according to the present invention.
Figure 3:
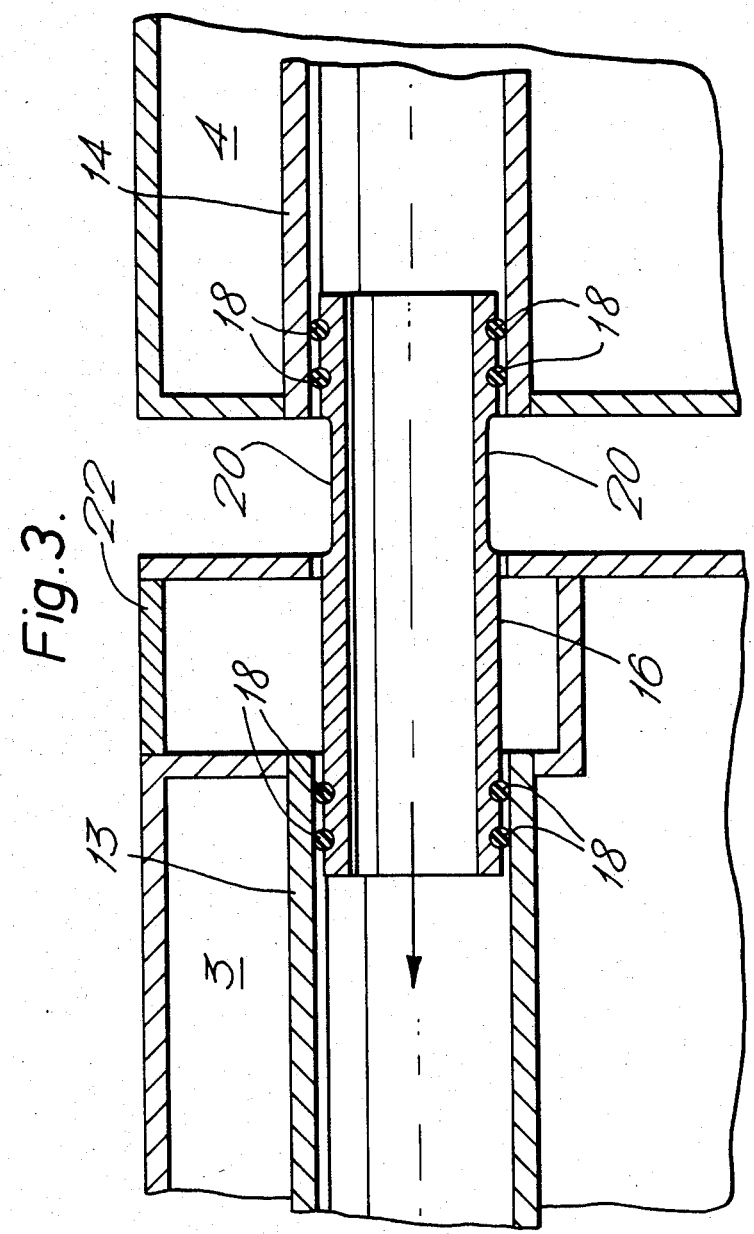
FIG. 3 is a enlarged view showing a detail of FIG. 2.

The system illustrated in FIG. 2, in which like reference numerals indicate like parts, and which incorporates the invention, consists of a typical one 13 of a number of roof shield cooling ducts which extend from a feed header main 8 and extend radially through the roof 3 from the side. Each duct 13 extends to nearly the complete width of the roof 3, and registers, when the shields 4 and 5 are in their 'parked' position (in rotatable sense) not only with a corresponding duct 14 extending across the sheild 4, but also, when the shield 5 is also in 'parked' position, with another corresponding duct 15 extending into the shield 5. A connecting pipe 16 fits within and spans between the ducts 13 and 14, and a connecting pipe 17 fits within and spans between the ducts 14 and 15. The connecting pipes 16, 17 each have 'O' rings 18, 19 (see FIG. 3), to effect sealing. Remotely operable mechanism, not shown but conventional in design, is provided for the successive withdrawal of connecting pipes 16, 17 to slide along the respective pipes until they are parked in ducts 13, 14 respectively and allow the shields 4, 5 to be rotated for refuelling purposes. Interlocks, (not shown) prevent the shields 4, 5 from rotation in the event the connecting pipes have not been withdrawn. Should the interlocks fail, the connecting pipes being made with thinned sections (FIG. 3 shows such a section 20 of connecting pipe 16) are able to shear easily when the respective shield is rotated. Note also that each duct 14 of shield 4 has a branch 21 to effect shield cooling. Outlet pipework similar to the described inlet pipework is also provided, not shown for the sake of simplicity. Access is provided at 22 for replacement of seals 18.

The construction according to the invention (FIGS. 2 and 3) is advantageous, in comparison with current designs such as the one shown in FIG. 1, in the following respects: pipework is enclosed within the body of the roof and shields and thus protected from damage, pipework does not occupy valuable space in above-roof/shield region, and sliding connection pipes allow much quicker re-routing of cooling gas when shutting-down and starting up in connection with refuelling, with consequent time saving in the refuelling operation.

What is claimed is:

1. A nuclear reactor having a roof in which shields are mounted for rotation and provided with ducting for the supply of gaseous coolant to the roof and shields characterised in that said ducting comprises ducts associated respectively with the roof and the shields and arranged to register with each other across the roof/shield and shield/shield gaps when the roof and said shields are in predetermined angular relation with each other, and further characterised in that the aligned ducts are connected to one another by connectors which bridge said gaps and are capable of being removed into one of the ducts which they interconnect so as to allow the shields to be rotated relative to the roof and to one another, and in which each connector is mounted for sliding movement in at least one of said ducts and is movable from an operative position in which it slidably engages within at least one of the ducts, and bridges the gap between a pair of ducts, and an inoperative position in which the connector is retracted into one of said pair of ducts to such an extent that it is clear of the other duct and thereby does not obstruct said relative rotation.

2. A nuclear reactor as claimed in claim 1 in which each connector is mounted for sliding movement in both ducts of a pair of ducts.

3. A nuclear reactor as claimed in claim 2 in which each of the connectors is formed with a thinned section to allow the same to shear readily in the event of said relative rotation taking place with the connector spanning the roof and a shield or the shields.

4. A nuclear reactor as claimed in claim 2 in which said shields comprise an inner shield and an outer shield and in which gaseous coolant is supplied to the inner shield through a first duct therein, a second duct in the outer shield which is connected to the first duct by a first said connector, and a third duct in the roof which is connected to the second duct by a second said connector.

5. A nuclear reactor as claimed in claim 4 in which the first connector is retractable into said second duct to allow relative rotation between the inner and outer shields and the second connector is retractable into the third duct to allow relative rotation between the outer shield and the roof.

* * * * *